United States Patent [19]

Baer et al.

[11] 3,866,122

[45] Feb. 11, 1975

[54] FM COMMUNICATION SYSTEM

[75] Inventors: Joseph Baer, Clifton; David M. Sacks, Nutley, both of N.J.

[73] Assignee: International Telephone and Telegraph Corporation, Nutley, N.J.

[22] Filed: Jan. 2, 1973

[21] Appl. No.: 320,414

[52] U.S. Cl. .......................................... 325/45, 325/9

[51] Int. Cl. .......................................... H04b 7/14

[58] Field of Search ............... 325/45, 46, 47, 48, 7, 325/14, 4, 346, 9, 11

[56] References Cited

UNITED STATES PATENTS

| | | | |
|---|---|---|---|
| 2,284,415 | 5/1942 | Goldstine | 325/9 |
| 2,407,212 | 9/1946 | Tunick | 325/7 |
| 2,407,213 | 9/1946 | Tunick | 325/7 |
| 3,195,047 | 7/1965 | Ruthroff | 325/4 |
| 3,329,900 | 7/1967 | Graves | 325/346 |
| 3,428,900 | 2/1969 | Newton | 325/346 |
| 3,530,383 | 9/1970 | Sassler | 325/346 |

*Primary Examiner*—Benedict V. Safourek
*Assistant Examiner*—Jin F. Ng
*Attorney, Agent, or Firm*—John T. O'Halloran; Menotti J. Lombardi, Jr.; Alfred C. Hill

[57] ABSTRACT

This FM communication system includes a first FM carrier system having a first FM deviation determined by a first FM index, a second FM carrier system having a second FM deviation determined by a second FM index greater than the first FM index and a third FM carrier system having a third FM deviation determined by a third FM index less than the second FM index. An FM deviation expander operating in either the RF or IF carrier frequency range is coupled between the receiver of the first carrier system and the transmitter of the second carrier system to expand the first FM deviation to equal the second FM deviation. The deviation expander has provisions for injecting a transmitter carrier spreading waveform, which is required for satellite communication systems, and/or local intelligence signals for frequency modulating a frequency stabilized carrier of the second carier system, the frequency stabilized carrier being produced in the expander. An FM deviation compressor operating in either the RF or IF carrier frequency range is coupled between the receiver of the second carrier system and the transmitter of the third carrier system to compress the second FM deviation to equal the third FM deviation. The deviation compressor enables the extraction of the local intelligence signals and/or the carrier spreading waveform from the carrier of the second carrier system, if present, and also provides a frequency stabilized carrier for the third carrier system.

20 Claims, 5 Drawing Figures

FM COMMUNICATION SYSTEM

BACKGROUND OF THE INVENTION

This invention relates to frequency modulation (FM) communication systems and more particularly to an FM communication system including two or more FM carrier communication systems having differing FM indices and an interface arrangement disposed between adjacent ones of the plurality of FM carrier systems to provide compatability between the FM carrier systems of differing FM indices.

In an FM communication system including, for instance, a terrestrial microwave carrier system at each end of a satellite space communication system there is an incompatibility between the FM indices of these two types of communication systems. Both of the terrestrial systems require only a small FM deviation determined by low FM indices while, to improve the signal-to-noise ratio in a satellite communication system, it is necessary to provide a high FM deviation determined by a high FM index. To make these two types of communication systems compatible it is necessary to expand the FM deviation of the terrestrial FM signal before being transmitted upon the satellite communication system and at the other end of the satellite communication system it is necessary to compress the FM deviation to equal the FM deviation of the terrestrial carrier system.

In the prior art this expansion and compression has been accomplished by demodulating the terrestrial FM carrier signal to baseband frequencies and the remodulating the baseband signals on the satellite communication system in a manner to increase or expand the frequency deviation so as to be compatible with the required high FM index of such a satellite communication system. At the other end of the satellite communication system the FM carrier of this system is demodulated to baseband and then remodulated in a manner to have an FM deviation compatible with the low modulation index of the terrestrial carrier system.

The major disadvantage of such an arrangement is the necessity of requiring baseband equipment at both of the interface systems. In addition the demodulation and remodulation process produces degradation of signal quality due to the injection of noise associated with modulation, demodulation and baseband equipment, and other devices necessary to the process.

SUMMARY OF THE INVENTION

An object of the present invention is to provide an FM deviation expander and an FM deviation compressor at both ends of a high modulation index communication system to render this system compatible with low modulation index carrier systems coupled to both ends thereof without the requirement of demodulating and remodulating the signals to baseband to provide compatibility of FM indices.

Another object of the present invention is to provide an arrangement to provide compatibility between two or more FM carrier signals of differing modulation indices, that eliminates the necessity of employing modulation, demodulation and baseband equipment.

Still another object of the present invention is to provide interface arrangements to render two or more FM carrier signals of differing FM indices compatible, without degradation of the signal-to-noise ratio.

A further object of the present invention is to provide an interface arrangement between two or more FM carrier systems of differing FM indices which will render the two or more carrier systems compatible and will also permit injection and extraction of locally generated signals.

A feature of the present invention is the provision of a frequency modulation (FM) communication system comprising: a first FM carrier system having a first FM deviation determined by a first given FM index; a second FM carrier system having a second FM deviation determined by a second given FM index greater than the first index; a third FM carrier system having a third FM deviation determined by a third given FM index less than the second index; first means coupled between a receiver of the first carrier system and a transmitter of the second carrier system operating in a first given frequency range greater than a baseband frequency range of any of the first, second and third carrier systems to expand the first deviation to equal the second deviation; and second means coupled between a receiver of the second carrier system and a transmitter of the third carrier system operating in a second given frequency range greater than a baseband frequency range of any of the first, second and third carrier systems to compress the second deviation to equal the third deviation.

Another feature of the present invention is the provision of a frequency modulation (FM) communication system comprising: a first FM carrier system having a first FM deviation determined by a first given FM index; a second FM carrier system having a second FM deviation determined by a second given FM index greater than the first index; and an arrangement coupled between a receiver of the first carrier system and a transmitter of the second carrier system operating in a given frequency range greater than a baseband frequency range of either of the first and second carrier systems to expand the first deviation to equal the second deviation.

A further feature of the present invention is the provision of a frequency modulation (FM) communication system comprising: a first FM carrier system having a first FM deviation determined by a first given FM index; a second FM carrier system having a second FM deviation determined by a second given FM index less than the first index; and an arrangement coupled between a receiver of the first carrier system and a transmitter of the second carrier system operating in a given frequency range greater than a baseband frequency range of either of the first and second carrier systems to compress the first deviation to equal the second deviation.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figures 1, 2:
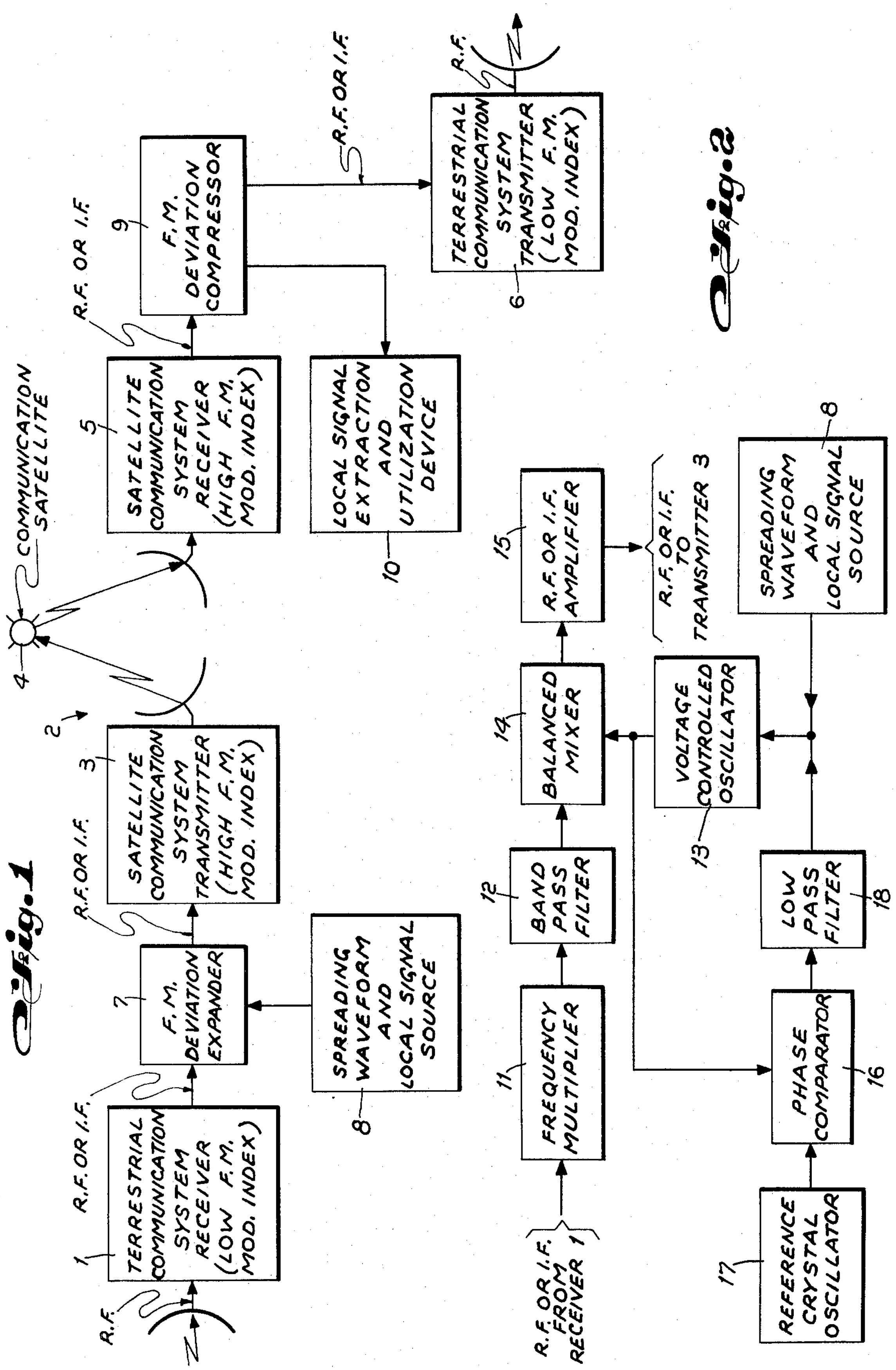
FIG. 1 is a block diagram illustrating an FM communication system in accordance with the principles of the present invention.
FIG. 2 is a block diagram of the expander of FIG. 1.

Referring to FIG. 1, there is illustrated therein an FM communication system incorporating, as an example, receiver 1 of a terrestrial FM carrier system having a low FM deviation as determined by a low FM index. A second FM carrier system 2 such as a satellite communication system having a high FM deviation determined by a high FM index to improve the signal-to-noise ratio of such a communication system. Satellite communication system 2 includes a transmitter 3, a communication satellite 4 and a receiver 5. A third FM carrier system including a transmitter 6 of a terrestrial communication system having a low FM deviation determined by a low FM index is coupled to the output of satellite communication system 2. Due to the differing FM indices of the three FM carrier systems, these systems are incompatible one with the other.

However, in accordance with the principles of the present invention the terrestrial communication system incorporating receiver 1 is made compatible with communication system 2 by employing FM deviation expander 7 which operates to expand the FM deviation of either the RF (radio frequency) or IF (intermediate frequency) carrier of receiver 1 to be equal to the FM deviation of the RF or IF carrier of communication system 2. Expander 7 has provisions therein for receiving a transmitted carrier spreading waveform signal or local signals, such as orderwire signals, from source 8 so that these signals may be frequency modulated upon the carrier at the output of expander 7 and, hence, the carrier of transmitter 3.

At the other end of the system FM deviation compressor 9 is employed as an interface between receiver 5 of system 2 and transmitter 6 of the terrestrial communication system. Compressor 9 operates at an RF or IF carrier frequency range in a manner to compress the high FM deviation in system 2 to equal the FM deviation in the system including transmitter 6. Compressor 9 has provisions therein to extract and utilize the local signals of source 8 as indicated by device 10.

Referring to FIG. 2, there is illustrated therein in block diagram form expander 7 of FIG. 1. Expander 7 increases the modulation index (FM deviation) of an IF or RF carrier without the requirement of frequency demodulation and remodulation and also inserts an additional frequency modulating signal upon the output carrier therefrom. For example, expander 7 increases the modulation index of an IF carrier of a terrestrial microwave system to a carrier deviation compatible with satellite communication system 2 and simultaneously superimposes a triangular waveform modulating signal on the carrier of system 2 for the purpose of radio frequency energy dispersal which is required by satellite communication systems. Also a voice frequency orderwire or subcarrier modulation may be inserted.

A RF or IF frequency modulated carrier with a given modulation index is coupled from receiver 1 to frequency multiplier 11 which multiplies the carrier frequency and the FM index (FM deviation). The output signal of multiplier 11 is rich in harmonics and is coupled to band pass filter 12 which is designed to select the desired harmonic from the output signal of multiplier 11 to thereby establish the multiplication factor necessary to achieve the desired expansion of the modulation index or FM deviation of communication system 2. The selected carrier harmonic is heterodyned with the output frequency of voltage controlled oscillator 13 in balanced mixer 14. The frequency at the output of oscillator 13 is equal to the frequency of the input carrier multiplied by the modulation index multiplication factor minus the desired output carrier frequency. Operation at a frequency below the multiplied input carrier frequency is required unless inversion of the modulating sense is required. Inversion of the modulating sense is accomplished by operating the voltage controlled oscillator 13 at a frequency equal to the frequency of the input carrier times the multiplication factor plus the desired output carrier frequency. The output signal of mixer 14 is the carrier frequency for communication system 2 FM deviated in accordance with the FM index of communication system 2. The output signal from mixer 14 is coupled through an RF or IF amplifier 15 to the appropriate point in transmitter 3.

The output frequency of voltage controlled oscillator 13 is also fed to phase detector 16 and compared to the output frequency of a stable reference crystal oscillator 17. The output of phase comparator 16 is low pass filtered in filter 18 and fed to the control input of oscillator 13 thereby forming a phase locked loop to insure adequate frequency stability of the output frequency of oscillator 13. The additional modulating signals from source 8 are summed with the low passed filtered phase detector output and controls oscillator 13 to additionally frequency modulate the output signal therefrom. Filter 18 must have a cut off frequency below the lowest added modulating frequency.

Compressor 9 used to decrease the modulation index of an FM RF or IF carrier without requiring demodulation to baseband and remodulation from baseband. The FM deviation at the output of compressor 9 equals the FM deviation determined by the FM index for the system including transmitter 6. For example, compressor 9 is used to decrease the modulation index of an IF carrier of a satellite communication system to a carrier FM deviation compatible with that normally used for the terrestrial microwave communication system including transmitter 6. Compressor 9 also permits the extraction and utilization of local signals, such as voice frequency orderwire communication.

Figures 3, 4:
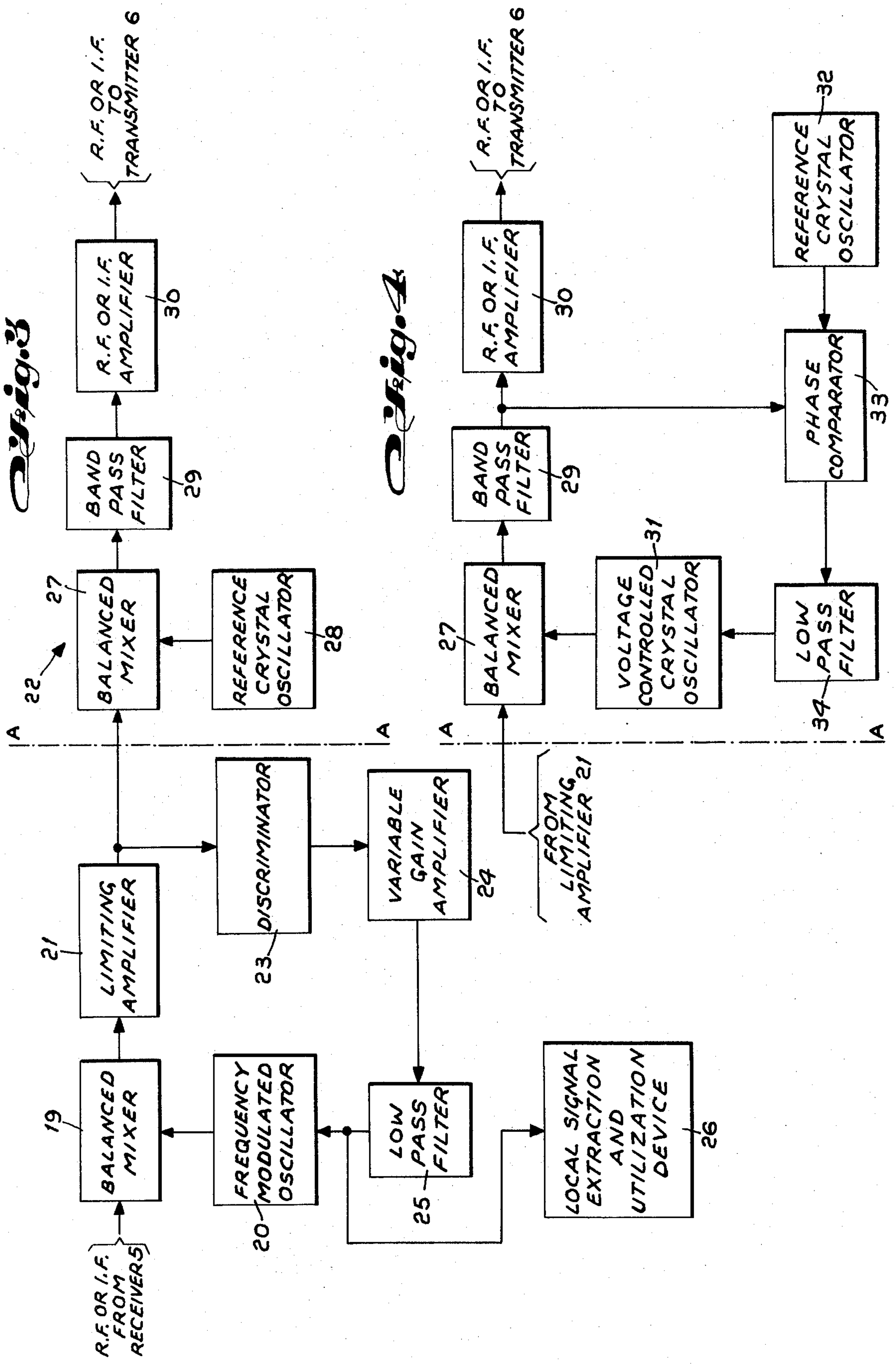
FIG. 3 is a block diagram of one embodiment of the compressor of FIG. 1.
FIG. 4 is a block diagram of still another embodiment of the compressor of FIG. 1 where the components of FIG. 4 are substituted for the components of FIG. 3 to the right of line A—A.

Referring to FIG. 3, compressor 9 is illustrated in block diagram form as including a balanced mixer 19 to receive the RF or IF FM deviated carrier from receiver 5 and the frequency output of frequency modulated oscillator 20. The resulting sum or difference frequency, as desired, is amplified and amplitude limited in limiting amplifier 21. The output of limiting amplifier 21 is coupled to both the frequency translation subsystem 22 and a frequency discriminator 23.

Frequency discriminator 23 extracts the FM deviation from the carrier of receiver 5 which is coupled through variable gain amplifier 24 and low pass filter 25 to the control input of frequency modulated oscillator 20. Discriminator 23, amplifier 24 and filter 25 form a feedback loop and cause oscillator 20 to be frequency modulated in such a manner that when combined with the FM deviated carrier from receiver 5 in mixer 19 to inversely modulate the incoming carrier and thereby subtract from or compress the instantaneous modulation index. The degree of modulation compression is directly proportional to the loop gain of the arrangement and is primarily provided by amplifier 24.

The output signal of filter 25 is a replica of the original modulating signal and thus device 26 coupled to the output of filter 25 is able to extract and utilize the local signal, such as orderwire signals and subcarriers for local utilization.

The output of limiting amplifier 21 is also coupled to frequency translation subsystem 22 which includes a balanced mixer 27 receiving its other input from reference crystal oscillator 28. With this arrangement the carrier having a compressed FM deviation is hererodyned to the desired carrier, either RF or IF, of the terrestrial communication system including transmitter 6 and is coupled to transmitter 6 through band pass filter 29 and amplifier 30.

It is possible by substituting the equipment shown in block form in FIG. 4 for the equipment to the right of line A—A of FIG. 3 to frequency stabilize the heterodyned carrier frequency for transmitter 6. This frequency stabilization which may be required for certain narrow band transmission systems employs a frequency centering loop which includes voltage controlled crystal oscillator 31 whose output frequency is coupled to balanced mixer 27 which translates the frequency of the carrier at the output of amplifier 21 to the desired carrier signal for coupling through band-pass filter 29 and amplifier 30 to transmitter 6. The translated carrier frequency at the output of filter 29 is compared to a reference crystal oscillator 32 in phase comparator 33. The output frequency of oscillator 32 has a frequency equal to the desired output carrier frequency. The output from comparator 33 is integrated in low pass filter 34 and is used to frequency shift oscillator 31. This loop acts as a phase locked loop which on a long term basis, compared to the lowest modulating frequency, re-centers the output carrier of mixer 27 to the frequency of the output of reference oscillator 32.

Figure 5:
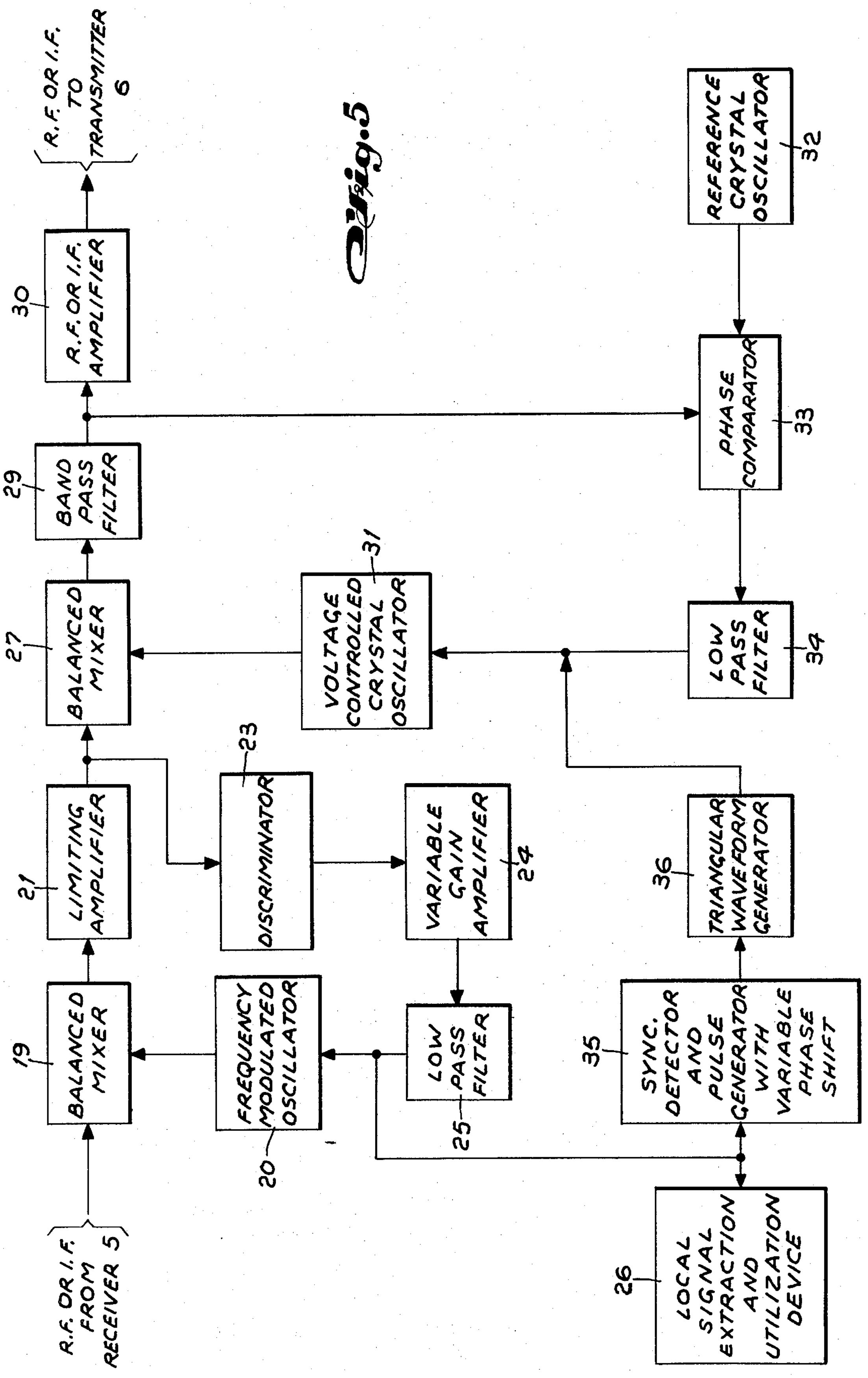
FIG. 5 is a block diagram of a further embodiment of the compressor of FIG. 1.

Referring to FIG. 5 there is disclosed therein a block diagram of a further embodiment of compressor 9 of FIG. 1. This embodiment includes all of the components of FIG. 3 to the left of line A—A to provide the desired frequency deviation compression to be compatible with the frequency deviation of the carrier system including transmitter 6 as described hereinabove with respect to FIG. 3. In addition this embodiment includes all of the components of FIG. 4 to frequency stabilize the heterodyne carrier frequency for transmitter 6 as described hereinabove with respect to FIG. 4. To these components of FIGS. 3 and 4 there is added an arrangement for removing an RF carrier dispersal, or spreading, waveform. This arrangement is employed when a satellite communication system baseband signal includes a video signal having a vertical sync pulse and the output signal of the satellite communication system interfaces with the input of a terrestrial microwave system where the additive modulation due to the presence of the spreading waveform is not desired.

The arrangement to remove the spreading waveform includes a sync detector and pulse generator with variable phase shift 35 and triangular waveform generator 36. Detector and generator 35 is connected to the output of filter 25 and detects the recovered video vertical sync pulse. This detected sync pulse is reshaped and delayed an amount equal to the transit time through the FM deviation compressor including mixer 19, amplifiers 21 and 24, discriminator 23, filter 25 and oscillator 20. This time delayed pulse triggers generator 36 which generates a waveform at the exact required frequency of the previously inserted triangular spreading waveform at the sending end of the satellite communication system. The triangular waveform generated by generator 36 modulates oscillator 31 in a phase directly opposite to the incoming phase of the triangular waveform of the compressed carrier at the output of amplifier 21. The amplitude of the triangular waveform modulating oscillator 31 is made exactly equal to that required to cancel the incoming carrier triangular modulation in mixer 27 so that no triangular modulation is coupled to transmitter 6.

While we have described above the principles of our invention in connection with specific apparatus it is to be clearly understood that this description is made only by way of example and not as a limitation to the scope of our invention as set forth in the objects thereof and in the accompanying claims.

We claim:

1. A frequency modulation (FM) communication system comprising:

- a first FM carrier system having a first carrier frequency modulated by a first FM deviation determined by a first given FM index;
- a second FM carrier system having a second carrier frequency modulated by a second FM deviation determined by a second given FM index greater than said first index;
- a third FM carrier system having a third carrier frequency modulated by a third FM deviation determined by a third given FM index less than said second index;
- first means coupled between a receiver of said first carrier system and a transmitter of said second carrier system operating in a first given frequency range greater than a baseband frequency range of any of said first, second and third carrier systems to expand said first deviation to equal said second deviation;
- second means coupled between a receiver of said second carrier system and a transmitter of said third carrier system operating in a second given frequency range greater than a baseband frequency range of any of said first, second and third carrier systems to compress said second deviation to equal said third deviation;
- said first given frequency range is selected from a radio frequency carrier range or an intermediate frequency carrier range;
- said second given frequency range is selected from a radio frequency carrier range or an intermediate frequency carrier range;
- said first means including
  - a third means coupled to said receiver of said first carrier system to frequency multiply said first carrier of said receiver of said first carrier system disposed in a selected one of said carrier ranges and said first deviation by a predetermined multiplication factor to cause said first deviation to equal said second deviation,
  - a first voltage controlled oscillator having a predetermined output frequency related to the frequency of said first carrier multiplied by said predetermined factor and the frequency of said second carrier of said transmitter of said second carrier system disposed in a selected one of said carrier ranges, a first balanced mixer coupled to said third means, said first voltage controlled oscillator and said transmitter of said second carrier system to provide said second carrier frequency modulated according to said second deviation, and a first phase locked loop coupled between the output and input of said first voltage controlled oscillator to frequency stabilize said predetermined output frequency;

said first phase locked loop including a reference oscillator having a stable frequency equal to said predetermined output frequency, a phase comparator coupled to the output of said voltage controlled oscillator and the output of said reference oscillator, and a low pass filter coupled between the output of said phase comparator and said voltage controlled oscillator; and local signals coupled to said first voltage controlled oscillator to frequency modulate said predetermined output frequency by said local signals.

2. A system according to claim 1, wherein said third means includes a frequency multiplier coupled to said receiver of said first carrier system, said multiplier output signal being rich in harmonics, and a band pass filter coupled to the output of said multiplier to select the appropriate one of said harmonics to establish said predetermined factor.

3. A system according to claim 1, wherein said local signals include a carrier spreading waveform.

4. A system according to claim 1, wherein said local signals include intelligence signals.

5. A system according to claim 4, wherein at least one of said intelligence signals include an orderwire signal.

6. A system according to claim 1, wherein said local signals include a carrier spreading waveform, and intelligence signals.

7. A system according to claim 6, wherein at least one of said intelligence signals include an orderwire signal.

8. A frequency modulation (FM) communication system comprising:

a first FM carrier system having a first carrier frequency modulated by a first FM deviation determined by a first given FM index;

a second FM carrier system having a second carrier frequency modulated by a second FM deviation determined by a second given FM index greater than said first index;

a third FM carrier system having a third carrier frequency modulated by a third FM deviation determined by a third given FM index less than said second index;

first means coupled between a receiver of said first carrier system and a transmitter of said second carrier system operating in a first given frequency range greater than a baseband frequency range of any of said first, second and third carrier systems to expand said first deviation to equal said second deviation;

second means coupled between a receiver of said second carrier system and a transmitter of said third carrier system operating in a second given frequency range greater than a baseband frequency range of any of said first, second and third carrier systems to compress said second deviation to equal said third deviation;

said first given frequency range is selected from a radio frequency carrier range or an intermediate frequency carrier range;

said second given frequency range is selected from a radio frequency carrier range or an intermediate frequency carrier range;

said first means including a third means coupled to said receiver of said first carrier system to frequency multiply said first carrier of said receiver of said first carrier system disposed in a selected one of said carrier ranges and said first deviation by a predetermined multiplication factor to cause said first deviation to equal said second deviation, a first voltage controlled oscillator having a predetermined output frequency related to the frequency of said first carrier multiplied by said predetermined factor and the frequency of said second carrier of said transmitter of said second carrier system disposed in a selected one of said carrier ranges, a first balanced mixer coupled to said third means, said first voltage controlled oscillator and said transmitter of said second carrier system to provide said second carrier frequency modulated according to said second deviation, and a first phase locked loop coupled between the output and input of said first voltage controlled oscillator to frequency stabilize said predetermined output frequency;

local signals coupled to said first voltage controlled oscillator to frequency modulate said predetermined output frequency by said local signals.

9. A system according to claim 8, wherein said predetermined output frequency equals the frequency of said first carrier multiplied by said predetermined factor minus the frequency of said second carrier.

10. A system according to claim 8, wherein said predetermined output frequency equals the frequency of said first carrier multiplied by said predetermined factor plus the frequency of said second carrier.

11. A system according to claim 8, wherein said second means includes a second balanced mixer coupled to said receiver of said second carrier system, a limiting amplifier coupled to the output of said second balanced mixer to amplitude limit the output signal therefrom, a frequency discriminator coupled to the output of said limiting amplifier to recover said second deviation, a variable gain amplifier coupled to the output of said discriminator to control the amplitude of said recovered second deviation, a low pass filter coupled to the output of said variable gain amplifier, a frequency modulated oscillator coupled between said second balanced mixer and said low pass filter, said frequency modulated oscillator being modulated by said amplitude controlled second deviation so that in cooperation with said second balanced mixer said second deviation of said second carrier is compressed to equal said third deviation, and fourth means coupled to the output of said limiting amplifier to convert the frequency of said second carrier to the frequency of said third carrier disposed in a selected one of said carrier ranges, said third carrier being frequency modulated according to said third deviation.

12. A system according to claim 11, wherein said fourth means includes a third balanced mixer coupled to the output of said limiting amplifier, and a stable oscillator coupled to said third balanced mixer to provide at the output of said third balanced mixer said third carrier frequency modulated according to said third deviation.

13. A system according to claim 11, wherein said fourth means includes a third balanced mixer coupled to the output of said limiting amplifier, a band pass filter coupled to the output of said third balanced mixer, a second voltage controlled oscillator coupled to said third balanced mixer to provide at the output of said band pass filter said third carrier frequency modulated according to said third deviation, and a second phase locked loop coupled between the output of said band pass filter and an input of said second voltage controlled oscillator to frequency stabilize said third carrier.

14. A system according to claim 13, further including a video signal having at least a vertical sync pulse propagated on said first, second and third carrier systems;

a carrier spreading waveform coupled to said first phase locked loop to frequency modulate said second carrier by said spreading waveform; and fifth means coupled to said low pass filter and said second voltage controlled oscillator to detect said vertical sync pulse and generate in response to said detected vertical sync pulse a predetermined waveform, said predetermined waveform frequency modulating said second voltage controlled oscillator in phase opposition to said spreading waveform frequency modulation on said second carrier to cancel said spreading waveform frequency modulation in said third balanced mixer.

15. A system according to claim 11, further including local signals coupled to said first voltage controlled oscillator to frequency modulate said second carrier by said local signals, and fifth means coupled to said low pass filter to recover said local signals.

16. A frequency modulation (FM) communication system comprising:

a first FM carrier system having a first carrier frequency modulated by a first FM deviation determined by a first given FM index;

a second FM carrier system having a second carrier frequency modulated by a second FM deviation determined by a second given FM index less than said first index; and an arrangement coupled between a receiver of said first carrier system and a transmitter of said second carrier system operating in a given frequency range greater than a baseband frequency range of either of said first and second carrier systems to compress said first deviation to equal said second deviation;

said given frequency range is selected from a radio frequency carrier frequency or an intermediate frequency carrier frequency;

said arrangement including a first balanced mixer coupled to said receiver of said first carrier system, a limiting amplifier coupled to the output of said first balanced mixer to amplitude limit the output signal therefrom, a frequency discriminator coupled to the output of said limiting amplifier to recover said first deviation, a variable gain amplifier coupled to the output of said discriminator to control the amplitude of said recovered first deviation, a low pass filter coupled to the output of said variable gain amplifier, a frequency modulated oscillator coupled between said first balanced mixer and said low pass filter, said frequency modulated oscillator being modulated by said amplitude controlled first deviation so that in cooperation with said first balanced mixer said first deviation of said first carrier is compressed to equal said second deviation, and first means coupled to the output of said limiting amplifier to convert the frequency of said first carrier to the frequency of said second carrier disposed in a selected one of said carrier ranges, said second carrier being frequency modulated according to said second deviation.

17. A system according to claim 16, wherein said first means includes a second balanced mixer coupled to said limiting amplifier, and a stable oscillator coupled to said second balanced mixer to provide at the output of said second balanced mixer said second carrier frequency modulated according to said second deviation.

18. A system according to claim 16, wherein said first means includes a second balanced mixer coupled to the output of said limiting amplifier, a band pass filter coupled to the output of said second balanced mixer, a voltage controlled oscillator coupled to said second balanced mixer to provide at the output of said band pass filter said second carrier frequency modulated according to said second deviation, and a phase locked loop coupled between the output of said band pass filter and an input of said voltage controlled oscillator to frequency stabilize said second carrier.

19. A system according to claim 18, further including a video signal having at least a vertical sync pulse propagated on said first and second carrier systems;

a carrier spreading waveform frequency modulated on said first carrier; and second means coupled to said low pass filter and said voltage controlled oscillator to detect said vertical sync pulse and generate in response to said detected vertical sync pulse a predetermined waveform, said predetermined waveform frequency modulating said voltage controlled oscillator in phase opposition to said spreading waveform frequency modulation on said first carrier to cancel said spreading waveform frequency modulation in said second balanced mixer.

20. A system according to claim 18, further including local signals coupled to said voltage controlled oscillator to frequency modulate said first carrier, and second means coupled to said low pass filter to recover said local signals.

* * * * *